United States Patent [19]

Busch-Vishniac et al.

[11] Patent Number: 5,552,883
[45] Date of Patent: *Sep. 3, 1996

[54] NONCONTACT POSITION MEASUREMENT SYSTEM USING OPTICAL SENSORS

[75] Inventors: Ilene Busch-Vishniac; Alvin B. Buckman; Janardhan K. Pavuluri, all of Austin, Tex.; Wanjun Wang, Baton Rouge, La.; Dahong Qian, Lowell, Mass.; Vladimir Mancevski, Austin, Tex.

[73] Assignee: Board of Regents, The University of Texas System, Austin, Tex.

[ * ] Notice: The term of this patent shall not extend beyond the expiration date of Pat. No. 5,367,373.

[21] Appl. No.: 340,099

[22] Filed: Nov. 21, 1994

Related U.S. Application Data

[63] Continuation-in-part of Ser. No. 978,227, Nov. 19, 1992, Pat. No. 5,367,373.

[51] Int. Cl.$^6$ .............................. G01B 11/26; G01C 1/00
[52] U.S. Cl. .................... 356/139.03; 356/141.1; 356/152.2
[58] Field of Search ........................... 356/139.03, 141.1, 356/152.2, 152.3

[56] References Cited

U.S. PATENT DOCUMENTS

| | | | |
|---|---|---|---|
| 3,869,799 | 3/1975 | Neuer et al. | |
| 4,047,816 | 9/1977 | Pell et al. | 356/139.03 |
| 4,655,548 | 4/1987 | Jue | |
| 4,691,446 | 9/1987 | Pitches et al. | 356/139.03 |
| 4,736,640 | 4/1988 | Hooks | |
| 4,742,376 | 5/1988 | Phillips | |
| 4,763,991 | 8/1988 | Klotz | |
| 4,964,722 | 10/1990 | Schumacher | 356/139.03 |
| 5,208,641 | 5/1993 | Mocker et al. | 356/6 |

OTHER PUBLICATIONS

Madden, R., Silicon Position Sensing Detectors for Precision Measurement and Control, *SPIE Advances in Optical Metrology*, vol. 153, 1978, pp. 101–107.

Schuda, F., High–precision, wide–range, dual–axis, angle monitoring system, *Rev. Sci. Instrum.*, vol. 54, No. 12, Dec. 1983, pp. 1648–1651.

Light, B., Optical Position Sensing Using Silicon Photodetectors, *Lasers & Applications*, Apr. 1986, pp. 75–79.

Ni, J., et al., a New On–line Measurement System for Machine Tool Geometric Error, *SME Manufacture Technology Review*, vol. 2, 1987, pp. 573–577.

Hamamatsu Photonics K.K., Position–Sensitive Detectors, *Hamamatsu Catalog*, Oct. 1988, 1126 Ichino–cho, Hammamatsu City, 435 Japan.

Schroer, G., et al., Optical Sensors for Position Measurements, *Sensors and Actuators*, 17, 1989, pp. 329–338.

Wang, W., et al., The Linearity and Sensitivity of Lateral Effect Position Sensitive Devices—An Inproved Geometry, *IEEE Transactions on Electron Devices*, vol. 36, No. 11, Nov. 1989, pp. 2475–2480.

(List continued on next page.)

*Primary Examiner*—Stephen C. Buczinski
*Attorney, Agent, or Firm*—Arnold, White & Durkee

[57] ABSTRACT

Optical and computational components are combined to form a high precision, six degree-of-freedom, single-sided, noncontact position measurement system. Reflective optical targets are provided on a target object whose position is to be sensed. Light beams are directed toward the optical targets, producing reflected beams. Electrical signals are produced indicating the points of intersection of the reflected beams and the position-sensitive detectors. The position sensitive detectors may be lateral-effect photodiodes. The signals are transformed to provide measurements of translation along and rotation around three nonparallel axes which define the space in which the target object moves.

18 Claims, 6 Drawing Sheets

OTHER PUBLICATIONS

Wang, W., et al., A Four–Dimensional Non–Contact Sensing System for Micro–Automation Machines, *Am. Soc. of Mechanical Engineers,* Winter Annual Meeting, Nov. 25–30, 1990, Dallas, Texas.

Grunwald, G., et al., High–resolution Vibration Measurements Using a Position–sensitive Photosensor, *Sensors and Actuators,* A. 25–27, 1991, pp. 467–472.

Qian, D., Design of a High Precision, Six–degree–of–freedom, Single–sided, Noncontact Optical Sensing System, *Micro–Automation Group,* Technical Report No. 19, Jan. 12, 1992, Dept. of Mechanical Engineering, The University of Texas at Austin, TX 78712.

Bokelberg, E. H. et al., Simultaneous Measurement of Six Coordinate Vibration: Three Translations and Three Rotations, *Proc. of the 11th Int'l Modal Anal. Conf.,* Soc. for Exp. Mech. Inc. and Union College, pp. 522–527, 1993.

Cafeo, J. A. et al., Measurement and Application of Experimental Rotational Degrees of Freedom for Mode Shape Refinement, *Int'l Jrnl. Anal. & Exp. Modal Anal.,* v 7 n 4 pp. 255–269, Oct. 1992.

Cafeo, John A. et al., Application of a Three Degree of Freedom Lazer Vibrometer for Experimental Modal Analysis, *Proc. of the 9th Int'l Modal Anal. Conf.,* Union College and Soc. for Exp. Mech. Inc., vol. II, pp. 1161–1167, 1991.

Sommer, H. J. III et al., Single–Beam Laser Vibrometer for Simultaneous Measurement of Translation, Pitch and Roll with Neural Network Caibration, *Proc. of the 12th Int'l Modal Anal. Conf.,* Soc. for Exp. Mech. Inc. and Union College, vol. II, pp. 1196–1201, 1994.

Trethewey, M. W. et al., A Dual Beam Laser Vibrometer for Measurement of Dynamic Structural Rotations and Displacements, *Jrnl. of Sound & Vibration,* 164(1), pp. 67–84, 1993.

NONCONTACT POSITION MEASUREMENT SYSTEM USING OPTICAL SENSORS

The Government has certain rights in the invention.

BACKGROUND OF THE INVENTION

This patent application is a continuation in part of U.S. patent application Ser. No. 07/978,227, filed Nov. 19, 1992, which issued as U.S. Pat. No. 5,367,373 on Nov. 22, 1994.

FIELD OF THE INVENTION

The claimed invention relates to methods and apparatus to measure position changes, i.e., displacements and rotations, of a sensed object in space, in six degrees of freedom (six-DOF).

Optical Sensor Applications

The assembly of mechanical items often requires that relatively large parts be fit together with very small dimensional tolerances. Such tasks pose a challenge for automation because the scales involved in the process typically span several orders of magnitude. Generally, the larger and more massive the parts to be assembled, the more substantial the assembly machine required to perform the task. As the assembly machine increases in size, however, the accuracy of open-loop control methods generally decreases.

One can significantly improve the accuracy of the assembly process by using closed-loop control techniques, but only if real-time sensory information on the relative location of parts to be assembled is available. Additionally, the accuracy of the closed-loop assembly process is limited by the accuracy of the sensed information. Hence, operations requiring high accuracy placement of parts must use high resolution sensors in closed-loop control systems. In some cases, the sensors must be multidimensional, detecting both translation and rotation of parts.

Lateral Effect Photodiode Sensors in Prior Systems

Lateral effect photodiodes have been used in the past in systems for monitoring position changes of an object, but known systems discussed in the literature are either limited to two-dimensional information, or are not realizable in a single plane, without loading the object through the addition of non-planar reflecting features such as prisms. For example, an earlier-described, four-dimensional system for inspection of tappet bore positions in a diesel engine used two lateral effect photodiodes placed on orthogonal surfaces. Another recently described six-DOF position sensing system employing lateral effect photodiodes relies on attaching mirrored tetrahedral targets to the surface of the object whose position is to be monitored. It effectively comprised two independent two-dimensional position sensing subsystems. Such systems, however, would not answer the need for precise position information in six-DOF without loading or significantly modifying the target.

Multi-dimensional Position Sensing

If, for example, it is desired to place a toothed gear with a spindle into a housing, one might need to sense and control part motion parameters in six-DOF, i.e., three rotational and three translational coordinates. The multi-dimensional position sensing problem thus encountered is very complex for two major reasons.

First, in assembly operations it is frequently unacceptable for the sensor to interfere with more than one side of a part (1) because it could limit the ability of the assembly machine to position the part, and (2) because different part surfaces may not be orthogonal or even flat. Second, cross talk between sensing channels tends to occur during use of multiple small sensor systems in close proximity. The above limitations impose substantial penalties on sensor systems in the form of slow performance, high cost and unnecessary complexity. In view of the resulting disadvantages, prior art systems have failed to meet one or more of the following sensor system design criteria.

High-Precision Sensing System Requirements

Six requirements must generally be met in high precision sensing for part assembly:

(1) The sensors must have high resolution. Typical assembly tolerances are of the order of 1–100 μm, so the sensor should be capable of translational resolutions of less than 1 μm and angular resolutions in the μrad range.

(2) Sensing must be noncontact so that delicate parts are neither damaged nor otherwise affected by the presence of the sensor.

(3) The sensing system must be light-weight, compact, and versatile in a wide range of assembly and machining operations.

(4) The sensing system must provide real-time continuous displacement and rotation (position) information usable as part of a feedback control scheme. Long delays associated with data processing are unacceptable, because they lower productivity and may result in system instability.

(5) The sensing system must be capable of simultaneous, multiple-coordinate sensing.

(6) The sensing system should not be prohibitively expensive.

Traditional Approaches to Position Sensing

Four main sensing approaches have generally been considered for noncontact displacement sensing: ultrasonic echo-ranging, inductance sensing, capacitance sensing, and optical sensing. Ultrasonic sensing can be ruled out for high-precision work on the basis of the accuracy needed for precision assembly tasks. For example, to obtain a 1 μm wavelength, one would require a 343 MHz sound wave. Regrettably, sound at such high frequencies is rapidly attenuated in air.

Inductance and capacitance approaches to displacement measurement sensors are also difficult to apply to high-precision work because (1) they are limited to particular classes of materials, (2) they are highly nonlinear, and (3) they are inherently one-dimensional in nature.

In contrast, optical methods in the form of vision systems offer accurate noncontact position sensing. Though frequently more expensive, larger, and computationally slower than desired, vision systems have nonetheless been adopted in many applications as the best available alternative.

The Mocker, et al. System

U.S. Pat. No. 5,208,641, issued to Mocker et al., discloses an optical system for determining the position of a pilot's helmet. Passive retro-reflectors are positioned on the helmet for reflecting light beams from a laser source mounted in the cockpit. The helmet position is measured using return time and beat frequency observations, and helmet motion may be detected by observing doppler-shifted signals. The Mocker system thus relies on measuring beam return times, and does not make use of reflected beam position information. Furthermore, the system described by Mocker is an inherently three dimensional system which cannot be made planar. It is far too large and impressive for the high resolution, high density application that the present invention is designed to address.

SUMMARY OF THE INVENTION

The present invention improves on previous vision systems for measuring position (thus permitting determination of displacement and rotation) of a sensed object by incorporating their most desirable features (accuracy and noncontact operation), while adding new features not previously available together in six-DOF vision systems (substantially real-time operation and relative simplicity). By applying relatively inexpensive optical elements in a uniquely compact configuration, sensor systems of the present invention operate in a noncontact mode, in substantially real time, and from one side of a sensed or target object, delivering displacement measurement information for a sensed object (target) in up to six-DOF. If desired, all sources and sensors in systems utilizing the present invention may be located in a single plane, although other configurations are also within the scope of this invention.

Whatever the embodiment and configuration chosen, sensor systems of the present invention employ light beams reflected from plane surfaces affixed to or prepared as integral parts of the object being sensed. By knowing the position of each projected and reflected beam, and the relative locations of the optical sensors and emitters, the set of beam movements with respect to a sensor may be transformed by calculation into changes of position (displacement and/or rotation) of the sensed (target) object in a space which may be defined by three nonparallel axes. In preferred embodiments, the three axes are orthogonal, and calculations to determine position (displacement and rotation) are performed by a digital computer. In preferred embodiments, the optical sensors are located in a "sensor plane", and they detect the intersections of the reflected light beams and the sensor plane. The present invention bears little if any resemblance to the Mocker, et al. System. Unlike the invention of Mocker, et al., the present invention uses the positions at which reflected light beams intersect a sensor plane to determine the position and orientation of the target object. Mocker, et al., uses retro-reflectors mounted on the target object to create reflected beams that always return to the source, and thus no information is conveyed by the positions of the reflected beams. Furthermore, the Mocker system employs moving parts, which are avoided in the present invention.

The invention is distinguished in three ways from prior sensing systems which do not substantially modify the moving target. First, in preferred embodiments it comprises a six-DOF sensor system, rather than the one- or two-DOF systems discussed in the literature and available commercially. Second, unlike a vision-type system, it may be based on compact and relatively inexpensive sensing elements. Third, the invention may use analog sensing elements rather than digital. This has the advantage of allowing for potential improvements in resolution while reducing the number of system parameters which must be manipulated. The novel system design dramatically reduces both the volume of data generated and the amount of computation required to produce the desired information. In summary, preferred embodiments of the claimed invention use novel combinations and configurations of standard optical components to achieve more accurate, faster, and more economical operation than standard vision systems for position sensing.

Among the more important optical components of preferred embodiments of the present invention are silicon lateral-effect photodetectors. They may be used in an inherently normalizing strategy so that results are independent of light intensity (making it unnecessary to calibrate for each reflecting surface). In particular, lateral-effect photodiodes may comprise each position-sensitive detector (PSD) in preferred embodiments because the photodiodes demonstrate high resolution and accuracy and because they are available in a form which yields four signals per device. The signals may be combined to develop two-dimensional information, making the devices appropriate for multiple-coordinate sensing. In preferred embodiments, PSD's are positioned to intercept light beams reflected from reflectors or reflecting surfaces on the sensed object, the specific positions of the reflectors and reflecting surfaces being determined by the signals needed to calculate the position of the sensed object in each embodiment of the present invention.

In alternative embodiments, this invention comprises a position and motion measurement system comprising a plurality of preferably collimated light beams aimed at a target comprising at least two reflective spots on a nonreflective background. The light reflected from the reflective spots comprises at least three relatively narrow reflected beams, whose positions are determined using position sensitive detectors. The information provided by the PSDs is provided as input to a digital computer or other processing mechanism, which calculates the desired target position and motion parameters. As long as the target is within the range of the system, its motion can be tracked in six degrees of freedom, that is, X, Y and Z translations as well as pitch, roll and yaw rotations.

BRIEF DESCRIPTION OF THE DRAWINGS

So that the manner in which the herein described advantages and features of the present invention, as well as others which will become apparent, are attained can be understood in detail, more particular description of the invention summarized above may be had by reference to the embodiment thereof which is illustrated in the appended drawings, which drawings form a part of this specification.

It is to be noted, however, that the appended drawings illustrate only exemplary embodiments of the invention and are therefore not to be considered limiting of its scope, for the invention may admit to other equally effective embodiments.

DEFINITIONS

| | |
|---|---|
| DOF | degree-of-freedom |
| $I_i$ | the photocurrent to electrode i (i varying from 1 to 4) |
| $I_{ij}$ | the photocurrent of the ith electrode of the PSD generated as a result of light source j |
| LED | light-emitting diode |
| $L_i$ | the length of each electrode |
| m | the number of beams irradiating the PSD |
| n | the normal to the boundary of the PSD electrode |
| OOP | out-of-plane |
| PAM | pulse amplitude modulation |
| $\Phi$ | out-of-plane rotation around y-axis |
| $\phi_r$ | the potential distribution caused by the reverse biasing voltage |
| $\phi_s$ | the potential distribution caused by the photovoltage |
| $\phi_{sj}$ | the potential distribution induced by source j |
| planar | in-plane |
| PSD | position-sensitive detector |
| $\psi$ | out-of-plane rotation around x-axis |
| $\theta$ | in-plane rotation around z-axis |
| $V_r$ | reverse-biased voltage |
| x-axis | one of two axes for planar translation |
| y-axis | one of two axes for planar translation |
| z-axis | axis for out-of-plane translation |

DETAILED DESCRIPTION

Preferred Embodiments

In the four embodiments of FIGS. 1, 2, 3 and 5 that will be described herein, the six-DOF position sensing system of the instant invention comprises two sections: 10 and 70, 11 and 70, 12 and 70, or 13 and 68 respectively, each having its own assembly of light sources, reflectors and sensors. In the embodiments (FIGS. 4, 8 and 9) the functions of the two sections are combined in one section.

Figure 1:
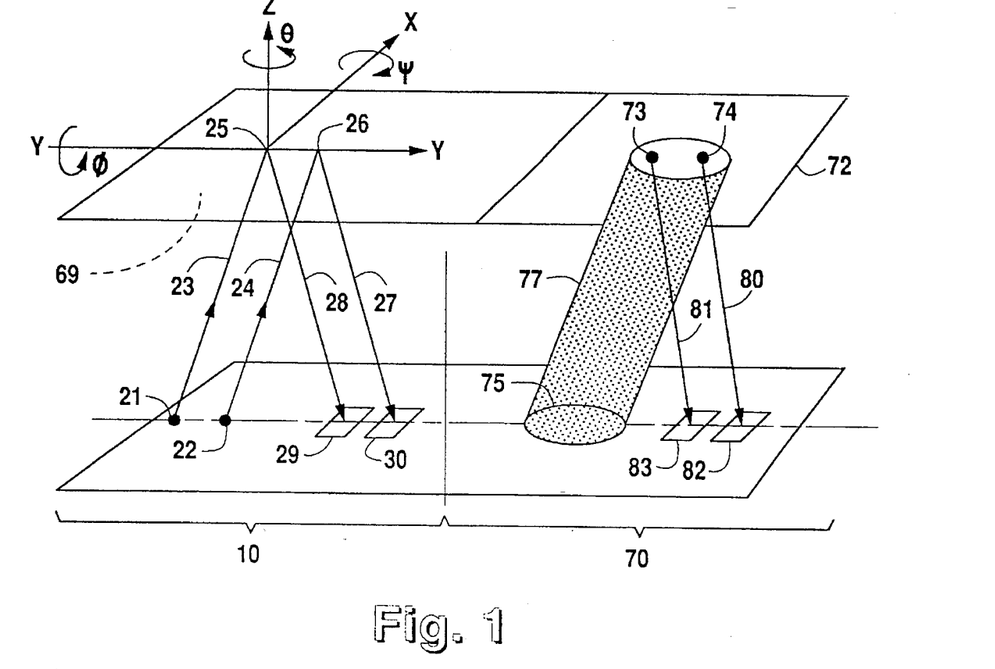
FIG. 1 illustrates a six-DOF position measurement system comprising two substantially parallel beams which are used to measure out-of-plane (OOP) position changes, plus a single beam to measure in-plane position changes.
Figure 2:
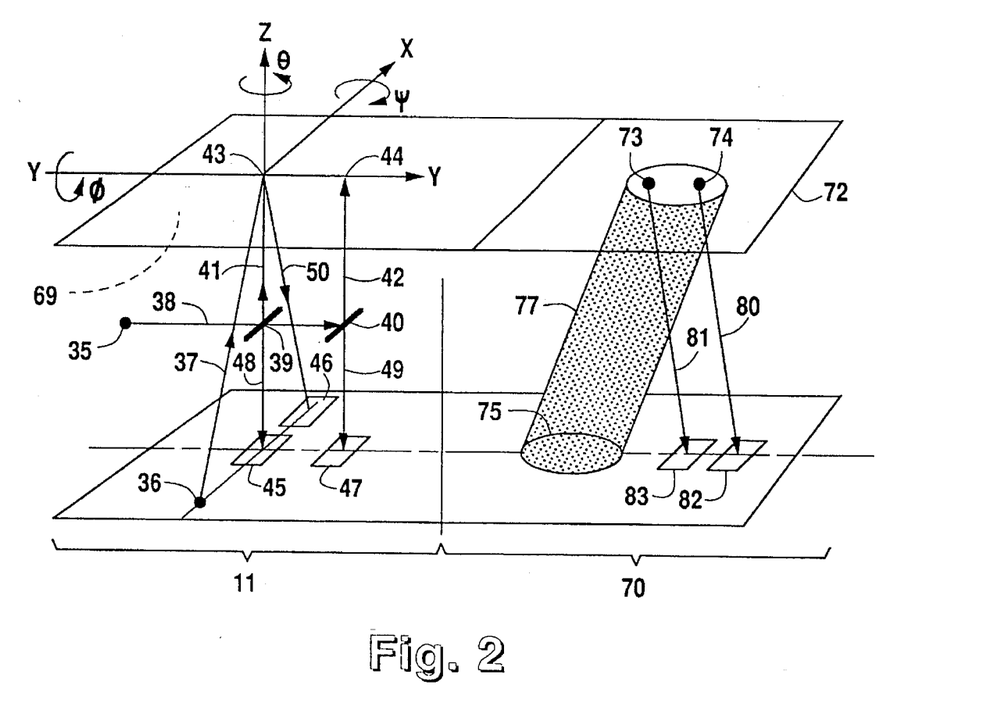
FIG. 2 illustrates a six-DOF position sensor system comprising parallel and nonparallel beams to measure OOP position changes, plus a single beam to measure in-plane position changes.
Figure 4:
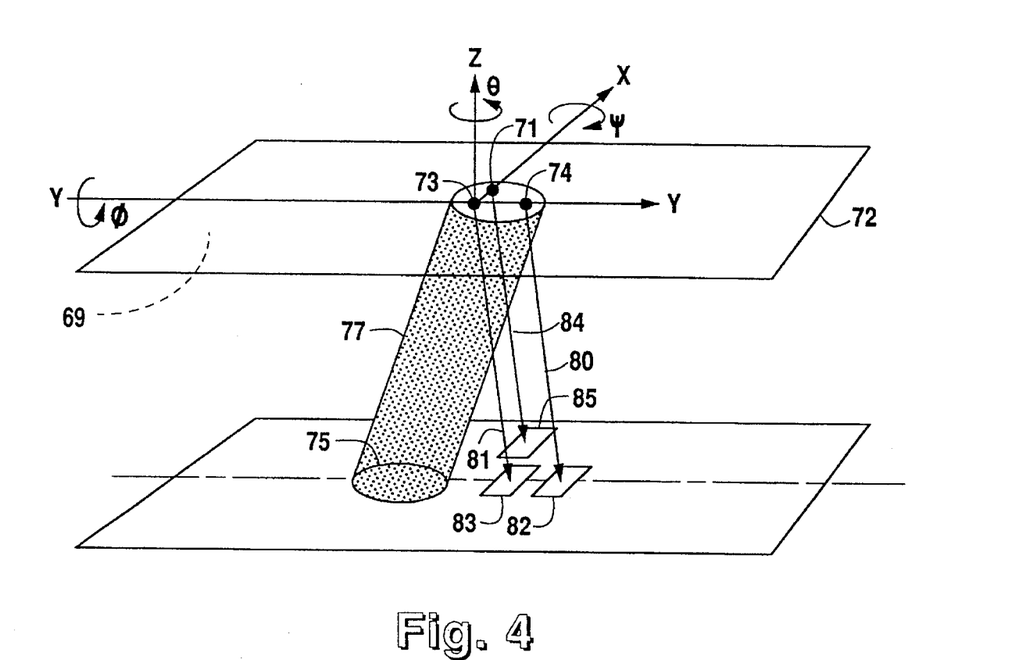
FIG. 4 illustrates a six-DOF motion sensor comprising a single beam to measure both OOP and in-plane position changes.
Figure 5:
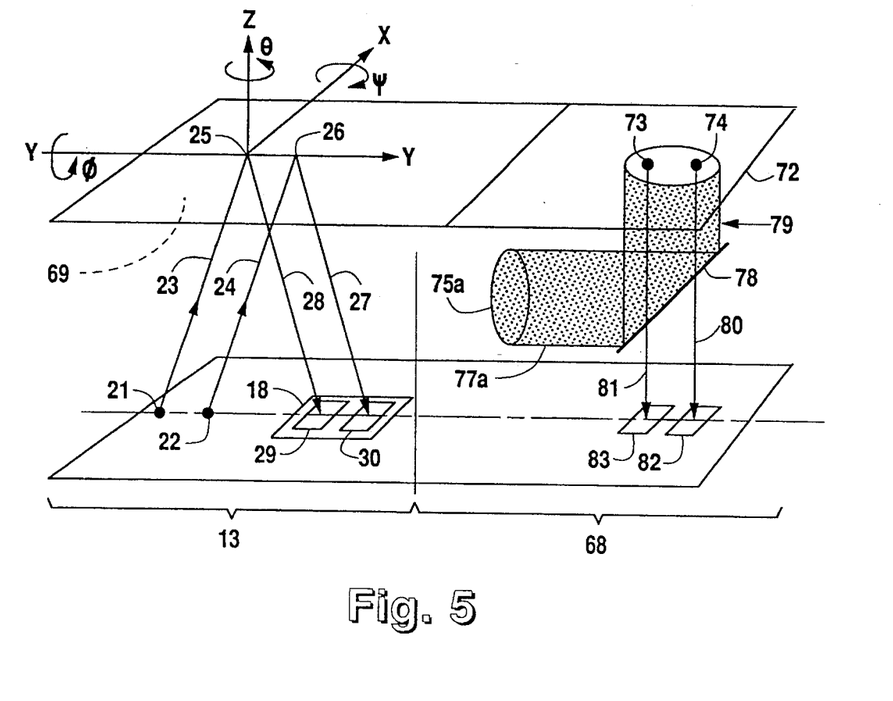
FIG. 5 illustrates a six-DOF position measurement system substantially as in FIG. 1 except that OOP movements are sensed on a single PSD and the light source for the in-plane measurement section is not in the plane of the PSD's.

Considered separately, the embodiments of the first section, labeled 10, 11, 12 and 13 in FIGS. 1, 2, 3 and 5 respectively, are for measurement of out-of-plane (OOP) motion. The second section 70 is for measurement of in-plane motion and is identical in FIGS. 1, 2 and 3. Section 68 (FIG. 5) is also for measurement of in-plane motion and differs from section 70 in FIGS. 1, 2 and 3 in that in section 68, light beam 77a, projected by emitter 75a, is deflected by mirror 78 to form a deflected beam 79 before reflection from substantially point reflectors 73, 74. Although elements of the invention will in most instances be configured so that light sources and sensors are substantially coplanar (FIGS. 1, 3, 4 and 8), FIGS. 2, 5 and 9 illustrate as examples embodiments wherein all sources and sensors are not coplanar.

Figure 3:
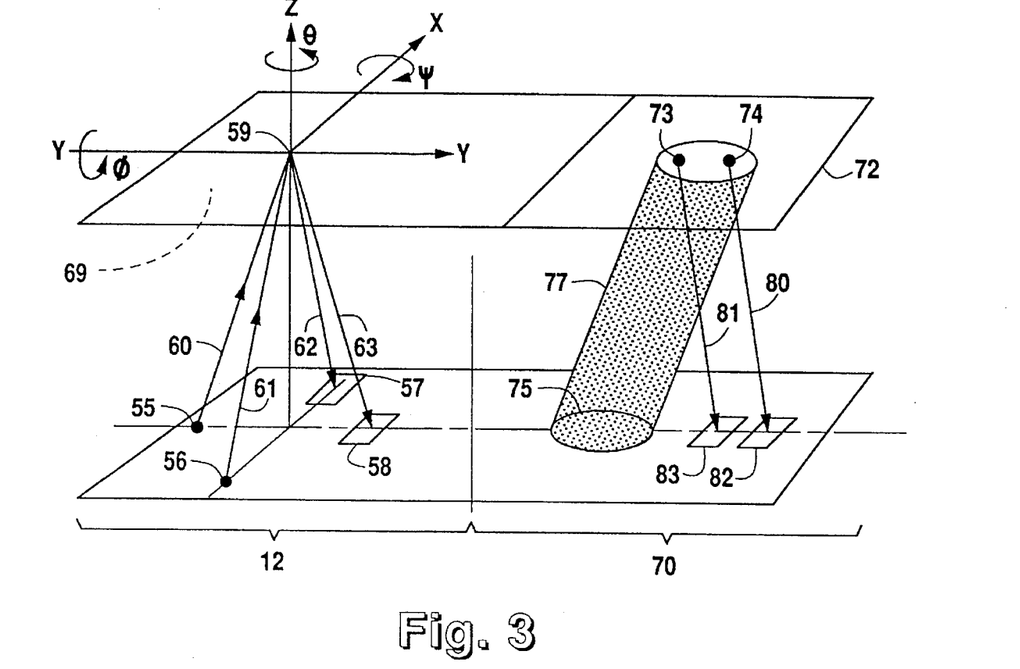
FIG. 3 illustrates a six-DOF motion sensor system comprising two nonparallel beams to measure OOP position changes, plus a single beam to measure in-plane position changes.

In each of the embodiments represented in FIGS. 1, 2 and 3, the OOP section comprises two light sources or emitters (called first and second beam emitters and numbered 21 and 22, 35 and 36, and 55 and 56 respectively), while the in-plane section comprises a single (target beam) emitter 75. First and second emitters emit first and second projected beams (23 and 24 in FIG. 1, 37 and 38 in FIG. 2, and 60 and 61 in FIG. 3), while the target beam emitter emits a target beam 77. In section 70, there is a single (target beam) emitter 75 projecting a beam 77 which on reflection from 73, 74 (substantially point reflectors) becomes reflected-target beams 80 and 81 in FIGS. 1, 2, and 3. In FIG. 5, emitter 75a projects target beam 77a, which is deflected by mirror 78 to form deflected beam 79 prior to reflection from 73, 74 as reflected-target beams 80 and 81. In the embodiment of FIG. 4, a single emitter 75 projects beam 77 to substantially point reflectors 71, 73 and 74, and reflected-target beams are identified as 80, 81 and 84 in FIG. 4. Further as to terminology in the present application, light beams projected from first and second emitters are, after reflection from the target object, first and second reflected beams respectively. Note, however, that a projected beam (e.g., a first projected beam) may be split into a plurality of beams. In that case, each of the plurality of beams will, on reflection from the target object, comprise a reflected beam (e.g., a first reflected beam), and each individual beam of the plurality reflected will be a split reflected beam (e.g., a split first beam). A single target beam may also produce a plurality of reflected beams (as in FIGS. 1–3 and 5) or perhaps three reflected beams (as in FIG. 4) which will be referred to as target-reflected beams. If the target beam 77 itself is deflected prior to reflection as in FIG. 5 (where the target beam is 77a), individual reflected beams 80 and 81 will be deflected target-reflected beams. Further, a target beam is preferably collimated, and a deflected beam impinging on the point reflectors will then be a deflected-collimated target beam.

The plane which serves as a reference for motion measurement is the reference plane 72, which in preferred embodiments may be substantially parallel to the plane in which reflectors 73 and 74 are positioned. The reference plane 72 is drawn coplanar with OOP reflectors 73 and 74 in FIGS. 1 and 5, 43 and 44 in FIG. 2, and 59 in FIG. 3 for illustrative purposes only, i.e., for illustrative purposes only, the OOP reflectors in FIGS. 1–3 and 5 may be considered to be portions of a reflective surface 69 of plane 72. Plane 72 is also drawn to contain the x and y axes of the three-axis set (x, y and z) which defines the space in which the sensed object moves. In preferred embodiments the axes are orthogonal, although this condition is not essential for operation of the invention.

Figure 7:
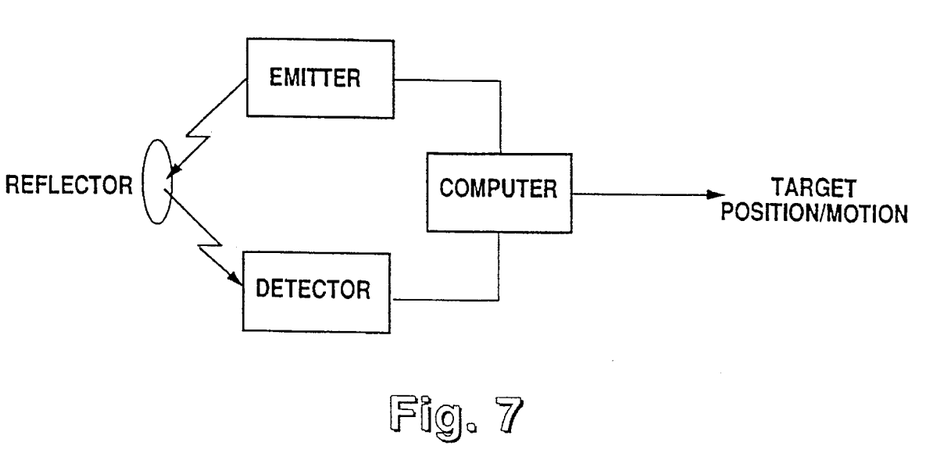
FIG. 7 is a block diagram illustrating an embodiment including a computer that generates an output containing information regarding position or motion of a target object.

Referring to FIG. 7, in preferred embodiments each emitter 130 and detector 132 is connected to a digital computer 134 which controls the operation of the emitter and detector, and which calculates the position and/or the motion of the target object based on information received from the detector 132 which detects the position of a light beam reflected from reflector 136, which is disposed on the surface of the target object. The calculations performed by computer 134 may comprise the transformations set forth elsewhere in this specification.

Measurement of OOP Parameters z, $\Phi$, and $\psi$

The OOP parameters measured by the first section 10, 11, 12, 13 are translation along the z axis, and rotation about the x and y axes, which are $\psi$ and $\Phi$ respectively. The in-plane parameters measured by second section 70, 68 are translation along the x and y axes, and rotation around the z-axis ($\theta$). Although the second section 70, 68 uses separate sensors and sources in the four embodiments illustrated in FIGS. 1, 2, 3 and 5, the final determination of these parameters is dependent on the earlier-determined OOP parameters in each case. This means that errors in any OOP parameter determination may produce errors in the in-plane parameter determinations, whereas OOP motion determinations are insensitive to in-plane motion (assuming that the reflectors extend beyond the sensing range in the x and y directions).

Four separate embodiments of the OOP sensing section, labeled 10, 11, 12 and 13, are illustrated on the left sides of FIGS. 1, 2, 3 and 5 respectively. Distinctly different emitter/sensor arrangements are used in each illustrated preferred embodiment; in the embodiments of FIGS. 1 and 5, the two light beams 23, 24 projected from emitters 21, 22 are substantially parallel, while in the embodiments of FIGS. 2 and 3, emitted beams 37, 38, 60, 61 are nonparallel. In all four cases, each PSD 29, 30, 45, 46, 47, 57, 58, 18 produces four signals related to the two-dimensional position of each light beam striking it. Thus, there is adequate information to calculate the three OOP parameters. As long as the target surface 69 is reasonably reflecting, none of these arrangements requires modification of the object to be sensed. It should be noted that the reflective surfaces used in OOP sensing sections may comprise a continuous and planar surface (a first reflective surface) or a plurality of reflective surfaces. In the latter case, individual surfaces are referred to collectively as a first reflective surface, and may be, but need not be, parallel or coplanar.

Referring to FIGS. 1 and 5, the OOP sensing section 10 shows two of the preferred sensor and target geometries for measurement of the OOP parameters z, Φ, and ψ; in these Figures and throughout this application, it is assumed that the targets (reflectors) may be treated as flat light-reflecting planes or surfaces. In the OOP portion 10 of the FIG. 1 and FIG. 5 sensor, the two light sources or emitters 21, 22 are not in the reference plane 72 but project substantially parallel light beams 23 and 24 which reflect obliquely off portions 25, 26 of reflective surface 69 to impinge on two PSD's 29, 30 (in the embodiment of FIG. 1) or one PSD 18 (in the embodiment of FIG. 5). In the latter embodiment, positions of the two light beams on PSD 18 are separately detected through multiplexing/demultiplexing techniques discussed below.

PSD's 29, 30, 18 are not in the reference plane but are on the same side of the reference plane as emitters 21 and 22. Note that portions 25, 26 of reflecting surface 69 are illustrated as substantially parallel to or coplanar with the reference plane 72, but need not be. Further, surface portions 25, 26 themselves are illustrated as substantially parallel or coplanar but need not be as long as the entire cross-section of each reflected beam 27, 28 is incident on the PSD's 29, 30, 18 of the respective embodiments and the relation of surfaces 25, 26 to each other is known.

The choice of emitters 21, 22 is a factor in determining the working range of the sensing system. The combined effects of spreading of the light beam and limitation of the PSD effective area will set the maximum working range of the sensor system for both OOP and in-plane parameters. The preferred embodiment for this invention is any LED whose intensity may be adjusted and whose light beam is confined to a narrow angular range (up to ±15 degrees).

Through careful placement of PSD's 29, 30, 18 and processing of the PSD signals, the influence of the z measurement on the difference signal can be removed. An advantage of this approach is that it results in relatively simple transformations to obtain Φ and ψ from the normalized output signals of each PSD. The z coordinate of target position may be determined from the OOP signals of any one of the PSD's 29, 30, 18. Then the values of Φ and ψ may be determined. Hence the disadvantage of this approach is that the accuracy of the angular-coordinates determination is dependent upon the accuracy with which z is determined.

An alternative to the substantially parallel light beam geometry illustrated in FIG. 1 is to introduce skewing between the projected light beams (see FIGS. 2 and 3). In these embodiments, a pure z axis translation of the target will cause relative motion between the light spots impinging on PSD's (45, 46, 47 in FIG. 2 and 57, 58 in FIG. 3). As a result, the inverse transformations to determine parameters z, Φ and ψ are more complex, but all determinations are made directly from the PSD signals. Further, errors in alignment of the emitters and PSD's can be compensated, whereas in the substantially parallel beam case (FIG. 1), precise alignment of emitters and PSD's is critical.

Referring to OOP section 11 of FIG. 2, emitter 35 projects a light beam 38 to half-silvered plane mirrors 39 and 40, each of which deflect and split incident beam 38, transmitting a portion of the beam as indicated and deflecting a portion of the beam. In preferred embodiments, a plurality of such mirrors, disposed so that mirror planes are parallel, are employed to produce a plurality of parallel split beams which impinge on a reflective surface of the sensed object. In FIG. 2, a portion of incident beam 38 is deflected from mirror 39 toward portion 43 of reflective surface 69, the path being indicated by beam 41. Another portion of beam 38 is transmitted through mirror 39 to mirror 40, from which a portion of it is deflected toward portion 44 of reflective surface 69 along a path indicated by beam 42. Light incident on portions 43, 44 of reflective surface 69 travels in substantially parallel paths 41, 42 and is reflected back to half-silvered mirrors 39, 40, where a portion of each beam is transmitted to PSD's 45, 47 along paths indicated by beams 48 and 49. The planes of portions 43, 44 of reflective surface 69 are preferably coplanar, but need not be coplanar or even parallel, as long as their relative locations are known.

Another portion of the OOP section 11 of FIG. 2 includes emitter 36, from which a beam of light 37 is projected obliquely to portion 43 of reflective surface 69 within or substantially parallel to reference plane 72, portion 43 being shown within plane 72 in FIG. 2 for illustrative purposes only. Reflected beam 50 is incident on PSD 46.

FIG. 3 illustrates another alternative to the substantially parallel light beam geometry illustrated in FIG. 1. In this embodiment, emitters 55 and 56 project nonparallel beams of light 60 and 61 obliquely toward reflective surface 59, while reflected beams 63 and 62 are incident on PSD's 58 and 57. Note that the number of PSD's required for OOP measurements in the embodiment of FIG. 3 (two) is the same number required by the embodiment of FIG. 1, and one less than the required number in the embodiment of FIG. 2.

Another design alternative for reducing the number of PSD's, gaining more freedom in their placement, and improving resolution, is multiplexing the two light sources (emitters). This may be done by modulating them individually so as to allow them to be electronically separated if their projected beams are simultaneously incident on a single PSD. The sources can be multiplexed, for example, in time, frequency or wavelength.

Measurement of In-Plane Parameters x, y, and θ

Extension of the techniques described above permits an in-plane sensing section 70, 68 to be added to any of the four embodiments of the OOP sensing section 10, 11, 12 and 13 (illustrated in FIGS. 1–3 and 5). In-plane sensing section 70, 68 monitors in-plane (planar) parameters of the target, a function which is identical in the embodiments of FIGS. 1, 2 and 3 and different in FIG. 5 in that target beam 77 is deflected before striking point reflectors 73, 74. This function requires that a plurality of substantially point reflectors 73, 74 be present on the target (shown coplanar with the reference plane 72 in the Figures for illustrative purposes only). Point reflectors 73, 74 in preferred embodiments are substantially round and have a surface area substantially less than that of the PSD's 82, 83 that receive the beams reflected from them. In certain preferred embodiments of the present invention, a plurality of point reflectors are disposed on a substantially non-reflective background so as to provide a plurality of individual reflected light beams 80, 81 when illuminated by incident (projected) beam 77, 77a from emitter (light source) 75, 75a, beam 77a being deflected by mirror 78 to become deflected beam 79 before illuminating point reflectors.

In in-plane section 70, 68 collimated light beam 77, 77a from single emitter 75, 75a is incident on special plane reflectors 73 and 74 (after deflection by mirror 78 in the case of FIG. 5). Beams 80 and 81 reflected from reflectors 73 and 74 are transmitted to PSD's 82, 83. Positions of reflected beams 80 and 81 on PSD's 82, 83 are determined from PSD output signals, and these positions are used in turn to calculate in-plane displacement and rotation (position) of the sensed object in space.

Data from light beams 80 and 81 incident on PSD's 82 and 83 can be combined with data from the PSD's associated with one of the OOP sections illustrated in FIGS. 1, 2, 3 or 5 to detect and measure motion of a sensed object in six-DOF. It would be apparent to one of skill in the art that the single target beam illustrated in the Figures could be replaced with a plurality of target beams, which may be parallel, and that are broad enough to illuminate the point reflectors throughout the intended range of motion of the sensed object.

An Embodiment with Combined Functions

Still another embodiment of a six-DOF optical sensing system is shown in FIG. 4. Several elements of the embodiment in FIG. 4 are common to the in-plane parameter measurement sections 70 of FIGS. 1, 2 and 3. There is an additional special plane reflector 71 (another point reflector) and a corresponding PSD 85 on which beam 84, reflected from reflector 71, is incident. Light paths are analogous to those described for in-plane sensing section 70 in FIG. 1. Note that in preferred embodiments of the present invention using a single emitter 75 (as in FIG. 4), the sensed object has at least three point reflectors disposed on a substantially nonreflective background. These point reflectors may be coplanar but need not be. Further, projected light beams are incident obliquely on the point reflectors in preferred embodiments. In the case of coplanar point reflectors, reflection of a collimated light beam, whether deflected or projected directly, results in at least three parallel reflected light beams.

Thus, each embodiment of the present invention illustrated in FIGS. 1–5 employs a plurality of reflected light beams incident on one or more PSD's to provide data which can be transformed into the three OOP and the three in-plane parameters describing motion or position of the sensed object.

Reflecting Surfaces on the Sensed Object

Modification of the sensed or target object to provide the reflective surfaces necessary to implement any of the preferred embodiments is easily accomplished. It is standard procedure in circuit board and semiconductor fabrication, for example, to place alignment features on a part to permit precise determination of part position. The features needed for this sensing system can be placed very accurately during fabrication and can be quite small; their placement can be made an integral part of the manufacturing process. For example, point reflectors 71, 73 and 74 may be applied as a thin film comprising an optically absorbing material surrounding two small reflective features. While FIGS. 1–3 show separate sections for the OOP and in-plane measurements, the invention can be made more compact by combining them into a single unit with a single set of reflective targets (assuming target motion is sufficiently small). In this case, time, frequency or wavelength multiplexing could be used to separate the OOP and in-plane measurements in data processing.

An alternative to a film target would be to integrate the target into the part itself. For example, one might cover a metal part in two areas and spray a thin coating of light-absorbing material onto the part, producing a part which has a light-absorbing area with two distinct, accurately placed reflectors embedded therein. For a part made from a material which is itself a poor reflector, one could deposit two small metal reflectors onto the part.

Differences Between In-Plane and OOP Measurements

In the embodiments shown in FIGS. 1, 2, 3 and 5, in-plane parameter measurement is different from OOP parameter measurement in a fundamental way. For the in-plane measurement section it is desirable that a relatively large area of the sensed object be illuminated simultaneously, whereas for the OOP section it is desirable that the impinging beam diameter be small. Since lateral effect photodiodes respond to the centroid of a light spot, the size of the reflectors and the beam diameter do not directly establish the resolution of the in-plane sensing section. Hence, it is not only feasible but desirable to use a single light source for the in-plane section of the sensing system, and to use two light sources and a single lateral effect photodiode for OOP motion sensing. However, the reflector size and source beam diameter do determine the range of operation, since the entire light spot must be on the sensor. Further, the size of the reflector can indirectly affect the resolution because it can determine the light intensity hitting the PSD. Greater light intensity produces a higher signal-to-noise ratio and better sensor resolution until the source level is so high that the sensors saturate. A single highly collimated light source (emitter), such as a light-emitting diode (LED), is used for in-plane measurements in preferred embodiments of the present invention, while a semiconductor laser or light projected from a fiber are the preferred sources for narrow beams required for the OOP section.

Figure 8:
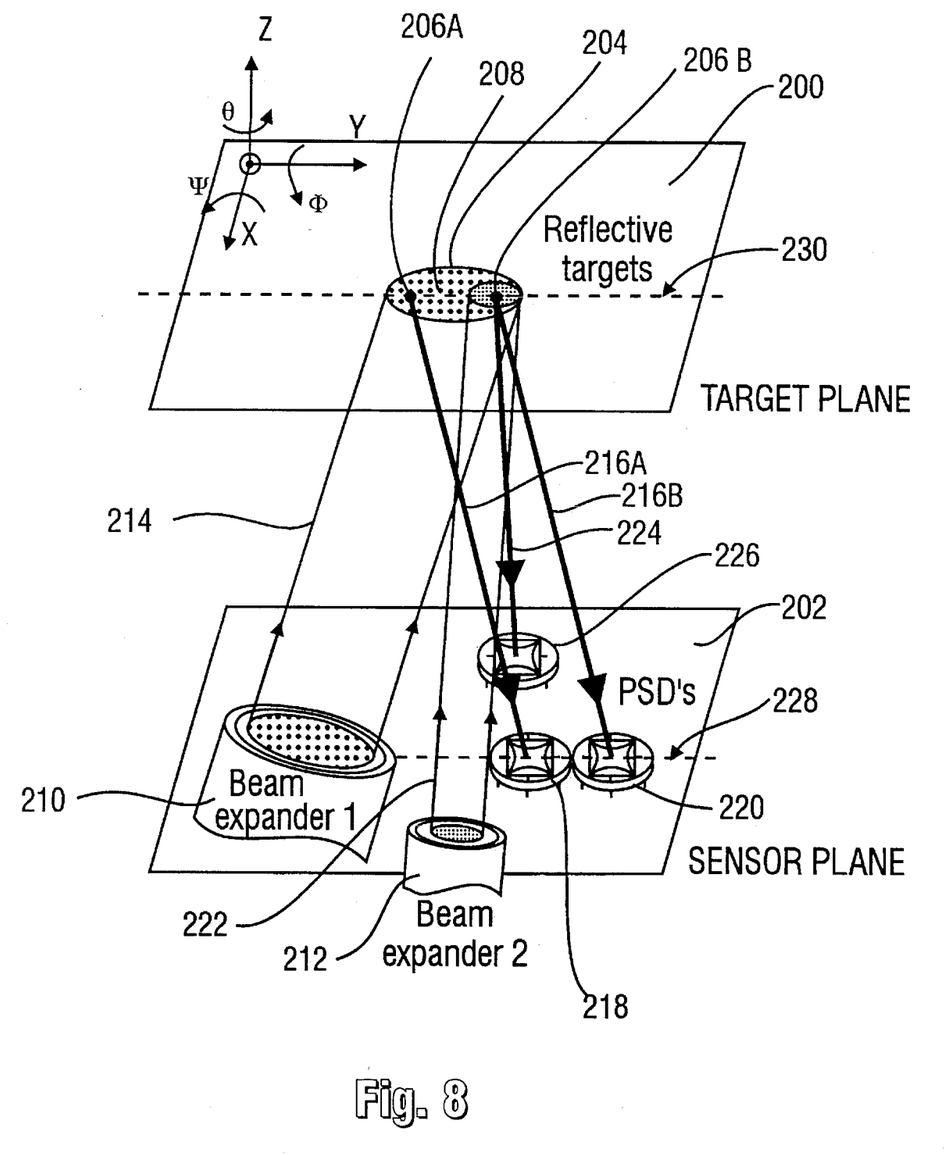
FIG. 8 illustrates a measurement system according to a preferred embodiment of the present invention having two collimated light beams, a target comprising two reflective spots on a non-reflective background, and three position sensitive detectors.
Figure 9:
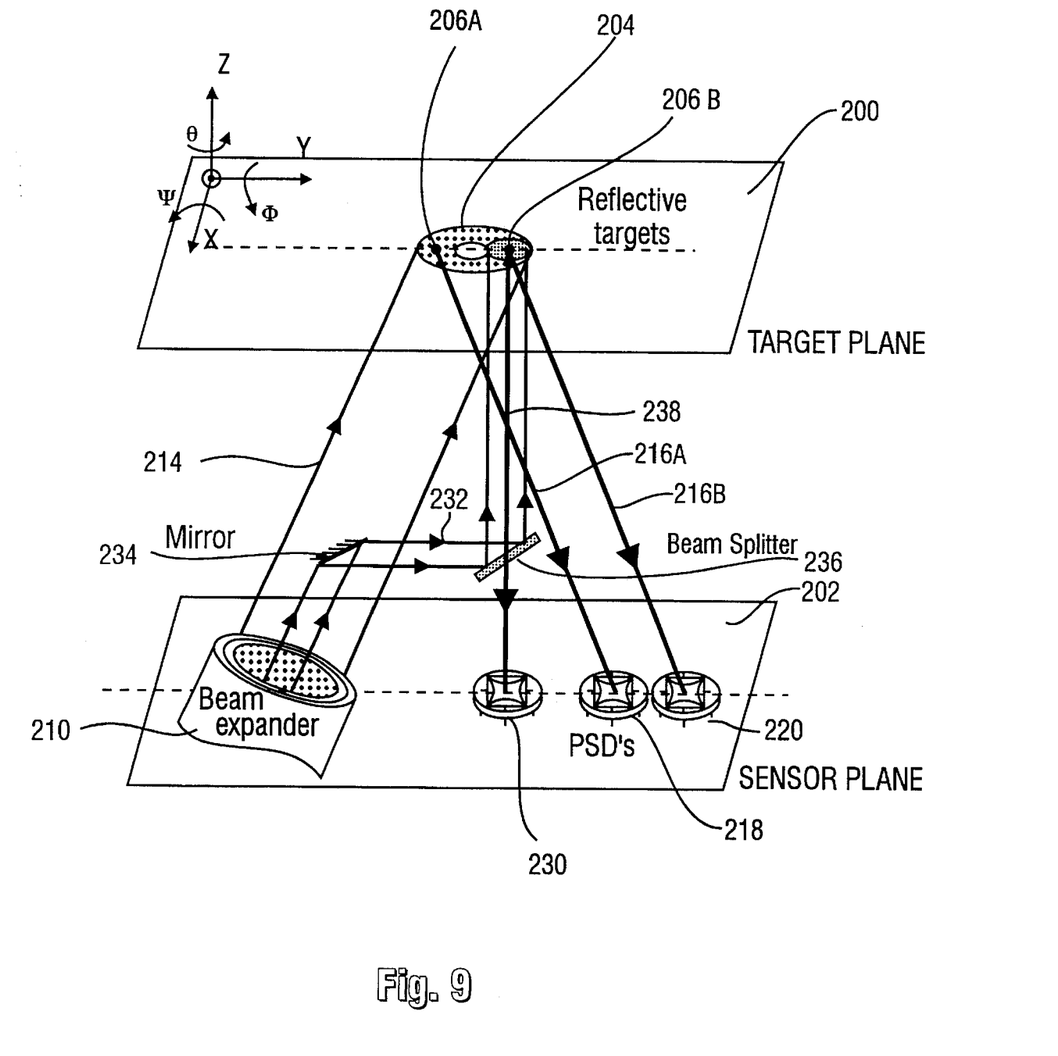
FIG. 9 shows another embodiment of the present invention that is similar to the embodiment shown in FIG. 8, wherein the second light beam is generated by using mirrors to deflect a portion of the first light beam so that it approaches the target from a different angle.

The embodiments shown in FIG. 8 and 9

FIG. 8 illustrates a preferred embodiment of the present invention that provides information regarding rotational and translational motion and position of the target plane 200 with respect to the sensor plane 202. The target plane comprises a target 204, which in turn comprises two reflective spots 206A, 206B on a non-reflective background 208. The target 204 is passive. The measurement system comprises first light beam source 210 and second light beam source 212. First light beam source 210 produces first light beam 214, which is preferably collimated. First light beam 214 is broad enough to impinge upon both reflective spots 206A, 206B of target 204 simultaneously, producing first reflected beam 216A and second reflected beam 216B traveling from the target plane 200 back toward the sensor plane 202. When the target 204 is within the range of the measurement system, the first and second reflected beams 216A, 216B impinge upon first position sensitive detector (PSD-1) 218 and second position sensitive detector (PSD-2) 220. Second light beam 222 is generated by second light beam source 212. Second light beam 222 is also preferably collimated, and it is aimed to impinge upon one of the spots 206B of target 204 so as to generate third reflected beam 224, which impinges upon third position sensitive detector (PSD-3) 226 when the target 204 is within range.

In the illustrated embodiment, both target spots 206A, 206B are positioned on target centerline 230 of the target plane, and first light source 210, PSD-1 218 and PSD-2 220 are located on sensor centerline 228, which is located in sensor plane 202 and is parallel to target centerline 230. Second light source 212 is spaced laterally from sensor centerline 228. PSD-3 226 is also spaced laterally from sensor centerline 228.

This geometrical arrangement of components is not required by the invention; other arrangements may be used, determined as a matter of design choice depending upon the nature of the application of the invention. The geometry of the system is taken into account during processing of the information provided by the sensor system. First light source 210 and second light source 212 may comprise collimators, beam expanders and other optical elements that are well-known in the art. The first and second light sources may also comprise a master light source, from which light may be conducted by optical fibers or other optical elements to, e.g., beam expanders in or near the sensor plane 202 which in turn, direct light toward target 204.

Each position sensitive detector provides two pieces of data indicating the position at which the corresponding reflected beam intersects the plane of the detector. Typically, that data is in the form of the x and y coordinates of the centroid of the light beam in the plane of the PSD. The system illustrated in FIG. 8 thus provides six pieces of data, two from each of the three PSDs. Each piece of data provided by the illustrated system is independent, and thus the data is sufficient to describe the translational and rotational position and motion of the target plane with respect to the sensor plane in all three dimensions (six-DOF).

Second light source 212 may alternatively provide a second light beam (not shown) that is broad enough to illuminate both spots 206A and 206B of target 204, thus producing a fourth reflected beam (not shown) that is directed from target 204 to fourth position sensitive detector (PSD-4) (not shown). With four PSDs, each providing two data points, eight data points are provided, thus providing some redundancy and error-checking capability, since only 6 data points are required to provide the desired information about the position and motion of the target.

FIG. 9 shows another alternative embodiment of the present invention. As in the embodiment shown in FIG. 8, first light source 202 provides first light beam 214, which impinges upon target 204 that is positioned on the target object in target plane 200. Target 204 comprises two point reflectors 206A, 206B located on a non-reflective background. When light beam 214 strikes target 204, point reflectors 206A, 206B produce first and second reflected beams 216A, 216B that are directed back toward sensor plane 202. Reflected beams 216A, 216B impinge upon first and second position sensitive light detectors 218, 220 (PSD-1 and PSD-2) when the target 204 is within the range of the measurement system. PSD-1 and PSD-2 218, 220 produce four pieces of data for use in determining the position and motion of target 204, in the same manner as the in-plane portion 70 of the embodiments illustrated in FIGS. 1–3.

The system shown in FIG. 9 provides two more pieces of data with third position sensitive detector 230 (PSD-3). A diverted portion 232 of first light beam 214 is intercepted by first mirror 234 and directed toward second mirror 236, which in turn directs said diverted portion 232 toward reflective spot, 206B on target 204. Light from said diverted portion 232 is reflected from said spot 206B to form third reflected beam 230, which strikes PSD-3 230 in a position which is determined by the position and orientation of the target 204 with respect to the sensor plane 202. One or both of first mirror 234 and second mirror 236 may be a beam splitting mirror. As shown in FIG. 9, the second mirror 236 may be positioned between spot 206B and PSD-3 230, such that third reflected beam 238 must pass through third mirror 236 to be detected by PSD-3 230. Alternatively, second mirror 236 may be spaced from the line between spot 206B and PSD-3 230, in which case second mirror 236 may be a conventional mirror. With each of the 3 PSDs providing two pieces of positional information, the motion of the target 204 can be resolved in six degrees of freedom.

Multiplexing Techniques

Figure 6:
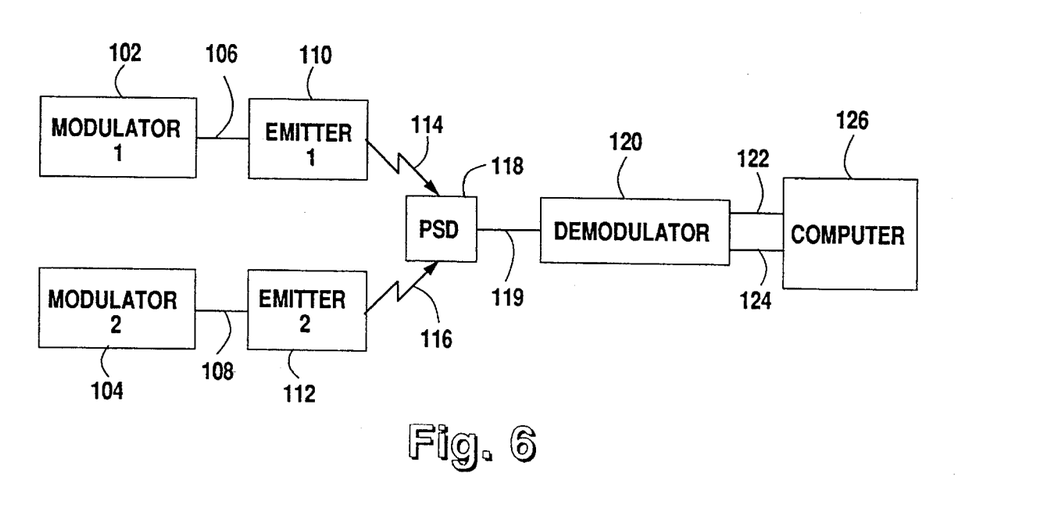
FIG. 6 is a block diagram illustrating the process of multiplexing two light beam positions on the same PSD, followed by demultiplexing signals from the PSD to recover the original light beam positions.

Position measurements of multiple light beams irradiating a single two-dimensional lateral-effect PSD (see PSD 18 in FIG. 5) can be made simultaneously through time, frequency or wavelength multiplexing. FIG. 6 is a schematic diagram illustrating a system for multiplexing two position measurements derived from light beams 114, 116 impinging on PSD 118. Light beams 114, 116 originate from emitter 1 and emitter 2, 110, 112 respectively, which are in turn modulated by modulator 1 and modulator 2, 102, 104 respectively, the modulators communicating with the emitters through links 106, 108 respectively. PSD 118 output is a multiplexed signal carried via link 119 to demodulator 120. Demodulator 120 outputs 122, 124 comprise reconstructed (demodulated) signals which represent the respective positions of light beams 114, 116 (from emitter 1 and emitter 2, 110, 112 respectively) on PSD 118. Signals 122, 124 are stored in the memory of computer 126 until needed for calculations relating positions of light beams 114, 116 on PSD 118 to other variables required for position measurement of a sensed object.

By analogous methods, several light sources may each be modulated at different frequencies and then demodulated in the sensor signal processing circuit using, for example, a pulse amplitude modulation (PAM) scheme. The position of each light spot can be determined even if there are other beams irradiating the PSD at the same time, and PAM is advantageous because it is one of the simplest modulation schemes to implement. Using PAM, each light source is modulated into a high frequency pulsed wave and then reflected onto the surface of a PSD. The PSD output photocurrents are then pulsed signals at the same frequency. These signals are amplified and filtered, and the DC mode is restored by using sample/hold amplifiers. By carefully synchronizing all of the pulse signals and the sampling commands, the position signals of each light source can be restored correctly and without distortion.

Experimental results show that the maximum difference between the measured positions of one light beam in the presence and absence of another beam is less than 0.25% of full scale. Further, this difference is repeatable and almost uniform throughout the entire PSD workspace; therefore it does not affect the resolution and accuracy of the measurement if the multiple light beams are always present. Test results also show that using multiple light sources simultaneously causes no change in the linearity and resolution of the sensor. The number of light beams which can be used simultaneously is limited only by the bandwidth of the PSD and signal loss considerations.

Thus, the main advantage of multiplexing is that the number of PSDs required in the presently claimed multidimensional sensing system can be reduced, while the signal processing circuitry is simultaneously simplified. The resulting system is more compact, and the changes largely eliminate alignment difficulties. Further, the effect of environmental variations is minimized as the number of PSD's is reduced.

The PAM technique described above is simply one example of a multiplexing technique that can be used to reduce the number of required sensors and sources for the present invention. A second easily described modulation approach, equally useful in this application, uses multiple signals, each pulsed off and on at the same frequency. By delaying the signals relative to one another, one could arrange to have at most a single light source active at any given time. This approach falls under the general heading of time multiplexing. A wide variety of additional multiplexing approaches, including frequency, time and wavelength multiplexing, are also suitable for this invention.

It is well known that when a light beam is projected onto the surface of a p-n junction, a photopotential is produced on each plane of the junction. The photocurrent generated on the surface will flow laterally toward the electrodes on the boundary because of the photopotential gradient in the lateral direction. This phenomenon is called the lateral photoeffect. The fundamental mechanism of the lateral photoeffect has been discussed in many papers.

The semiconductor PSD based on the lateral photoeffect has been well studied and applied extensively in various areas of optical inspection and measurement since it was first described by J. T. Wallmark ("A New Semiconductor Photocell Using Lateral Photoeffect," Proc. IRE, 45:474–483 (1957)). Several types of PSDs have been developed, such as the duolateral, pincushion and clover types. Both two-dimensional and one-dimensional versions of the devices are commercially available.

The lateral effect sensor can measure displacement in a spatially continuous manner, unlike other types of large-sensitive-area detectors such as charge-coupled devices. Because of the high linearity, good resolution, and fast response, the potential applications of PSDs are quite broad. For the present invention, all two-dimensional PSD's are suitable, although some have higher resolution or linearity and others have lower cost.

Normally, one PSD is needed to measure the displacement of each light beam. However, in an optical measurement system which uses multiple beams and multiple detectors, such as the precision multiple degree-of-freedom motion measurement system suggested by W. Wang ("Design Of An Optically Based Sensing System For Magnetically Levitated Micro-Automation Systems," Ph.D. Dissertation, Mechanical Engineering Department, University of Texas at Austin, December, 1989), the hardware can become large and redundant. Because of the combined cost of many PSD sensing elements, the system cost may become prohibitively high. Further, alignment difficulties tend to increase dramatically as sensing elements are added.

These problems can sometimes be avoided using a PSD array, but the array sensor has a low resolution (depending on the width of each pixel and the gap between pixels), and it is usually more difficult to fabricate. Therefore it is highly desirable to use a single PSD to measure the displacements of several light beams instead of using one PSD for each light beam. The resulting advantages are obvious: a more compact system, lower cost, faster calibration, and preservation of almost identical physical and environmental conditions for each measurand.

Borrowing from technology widely used in the telecommunication industry, a modulation method can be implemented to permit one sensor to monitor multiple light sources. For example, each light source may either be modulated at a different frequency or delayed in time so that only one source is on at a given instant. The position signals from the PSD sensor at each instant are superpositions of the position signals generated by each active source. The information on a specific light source location can be obtained through demodulation. Other modulation approaches besides the examples cited here may also be used successfully.

Kinematic Transformations

Transformations have been derived to calculate position and motion of a target object based on information supplied by the structures illustrated in FIGS. 1 and 3. Transformations for alternative embodiments of the present invention can be derived by one of skill in the art. Typical equations for the out-of-plane sections 11, 12 of FIGS. 1 and 3, respectively, are set forth below:

$$z = z_1 - \left( S_\alpha - \frac{z_1}{\tan(\alpha)} \right) \tan(\psi)$$

$$\tan(2\psi) = \frac{-g_1 + \sqrt{g_1^2 - 4g_0 g_2}}{2g_2}$$

$$\tan(2\phi) = \frac{-h_1 + \sqrt{h_1^2 - 4h_0 h_2}}{2h_2}$$

where:

$$z_1 = \frac{a_{11} - a_{12}\tan(2\psi)}{a_{21} + a_{22}\tan(2\psi)}$$

$g_2 = e_{12}f_1 - e_1 f_{12}$ $g_1 = e_2 f_1 - e_1 f_2 + e_0 f_{12} - e_{12} f_0$ $g_0 = e_0 f_2 - e_2 f_0$ $h_2 = e_{12} f_2 - e_2 f_{12}$ $h_1 = e_2 f_1 - e_1 f_2 + f_0 e_{12} - f_{12} e_0$ $h_0 = e_0 f_1 - e_1 f_0$ $e_{12} = a_{22} c_{12} - a_{12} c_{22}$ $e_1 = a_{12} c_{21} + a_{22} c_{11}$ $e_2 = a_{21} c_{12} + a_{11} c_{22}$ $e_0 = a_{11} c_{21} - a_{21} c_{11}$ $f_{12} = b_{22} d_{12} - b_{12} d_{22}$ $f_1 = b_{12} d_{21} + b_{22} d_{11}$ $f_2 = b_{21} d_{12} + b_{11} d_{22}$ $f_0 = b_{11} d_{21} - b_{21} d_{11}$ $S_\alpha$ is the distance between the pivot point of reflective surface 69 and the intersection of light beam 23 in FIG. 1 or light beam 60 in FIG. 3 with reflective surface 69, when reflective surface 69 and PSD (29, 30, 57, 58) are parallel. Z is measured at the pivot point of reflective surface 69. The pivot point is the point about which the reflective surface rotates in the $\Phi$ and $\psi$ directions, and it is the intersection of the x and y axes of the system.

The following equations apply to the embodiment illustrated in FIG. 1:

$a_{11} = Y_1 \tan^2 \alpha$ $a_{12} = [y_1 \tan\alpha + d (\tan^2\alpha + 1)] \sin(x_1)$ $a_{21} = 2 \tan\alpha$ $a_{22} = [\tan^2\alpha - 1] \sin(x_1)$ $b_{11} = y_2 \tan^2\beta$ $b_{12} = [y_2 \tan\beta + d(\tan^2\beta + 1)] \sin(x_2)$ $b_{21} = 2\tan\beta$ $b_{22} = [\tan^2\beta - 1)] \sin(x_2)$ $c_{11} = x_1$ $c_{12} = d$ $c_{21} = 0$ $c_{22} = 1$ $d_{11} = x_2$ $d_{12} = d$ $d_{21} = 0$ $d_{22} = 1$ where:

α is the angle between light beam 23 and the plane of PSD 29;

β is the angle between light beam 24 and the plane of PSD 30;

$x_1$ and $y_1$ are measurements obtained from PSD 29;

$x_2$ and $y_2$ are measurements obtained from PSD 30; and d is the initial distance between the reference plane and the sensed plane.

The following equations apply to the embodiment illustrated in FIG. 3:

$a_{11} = y_1 \tan^2\alpha$ $a_{12} = [y_1 \tan\alpha + d(\tan^2\alpha + 1)] \sin(x_1)$ $a_{21} = 2\tan\alpha$ $a_{22} = [\tan^2\alpha - 1] \sin(x_1)$ $b_{11} = y_2$ $b_{12} = d$ $b_{21} = 0$ $b_{22} = 1$ $c_{11} = x_1$ $c_{12} = d$ $c_{21} = 0$ $c_{22} = 1$ $d_{11} = x_2 \tan^2\alpha$ $d_{12} = [x_2 \tan\beta + d(\tan^2\beta + 1)] \sin(y_2)$ $d_{21} = 2\tan\beta$ $d_{22} = [\tan^2\beta - 1] \sin(y_2)$ where:

α is the angle between the first light beam 60 and the plane of PSD 58;

β is the angle between the second light beam 61 and the plane of PSD 57;

$x_1$ and $y_1$ are measurements obtained from the first PSD 58;

$x_2$ and $y_2$ are measurements obtained from the second PSD 57; and d is the initial distance between the reference plane and the sensed plane.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A high-precision, non-contact position measuring system for determining the position and motion of a target object with respect to a sensor plane, the measuring system being located substantially entirely in or behind the sensor plane, comprising:

a target placed on an exterior surface of the target object, the target comprising at least two planar point reflectors on a substantially non-reflective background;

a first light source for producing a first beam of light directed toward the target, the first beam of light being broad enough to illuminate the at least two planar point reflectors, thereby producing a first reflected beam reflected from one of the point reflectors and a second reflected beam reflected from another of the point reflectors;

a second light source for producing a second beam of light directed toward the target, the second beam of light being broad enough to illuminate at least one of the at least two planar point reflectors, thereby producing a third reflected beam reflected from said point reflector;

a first position sensitive detector positioned in the sensor plane to determine a location of intersection between the first reflected beam and the sensor plane;

a second position sensitive detector positioned in the sensor plane to determine a location of intersection between the second reflected beam and the sensor plane; and a third position sensitive detector positioned in the sensor plane to determine a location of intersection between the third reflected beam and the sensor plane.

2. The system of claim 1, further comprising a computer coupled to the first, second and third position sensitive detectors and programmed to determine the position of the target object with respect to the sensor plane based on information provided by the position sensitive detectors.

3. The system of claim 1, wherein the position sensitive detectors comprise lateral effect photodiodes.

4. The system of claim 3, wherein the light sources comprise semiconductor light emitters.

5. A non-contact measurement system for determining the position and motion of a target object with respect to a sensor plane, comprising:

a plurality of planar reflective targets positioned on the target object;

a first light source for providing a first beam of light that is directed so as to illuminate at least two of said reflective targets, thereby generating at least a first reflected beam of light and a second reflected beam of light;

a first detector positioned in the sensor plane to detect the position at which the first reflected beam of light intersects the sensor plane;

a second detector positioned in the sensor plane to detect the position at which the second reflected beam of light intersects the sensor plane;

a second light source for providing a second beam of light that is directed so as to illuminate at least one of said reflective targets, thereby generating a third reflected beam of light; and a third detector positioned in the sensor plane to detect the position at which the third reflected beam of light intersects the sensor plane.

6. The system of claim 5, further comprising a digital computer coupled to each of the first, second and third detectors, the digital computer being programmed to calculate the position and motion of the target object based on output signals generated by the detectors.

7. The system of claim 5, wherein the first light source and the second light source both receive light through optical fibers from a master light source and direct that light toward the target.

8. The system of claim 7, wherein the master light source comprises a light emitting diode.

9. A method for measuring the position of a target object in space without physically contacting the target object, comprising the steps of:

providing on a target object a target, the target comprising at least three planar point reflectors on a substantially non-reflective background;

projecting a target beam toward the target so as to impinge upon all three point reflectors;

reflecting the target beam from the point reflectors to produce a plurality of reflected beams;

determining locations at which the reflected beams intersect a sensor plane; and calculating the position of the target object with respect to the sensor plane using the locations at which the reflected beams intersect the sensor plane.

10. The method of claim 9, further comprising providing lateral effect photodiodes in the sensor plane for determining the locations at which the reflected beams intersect the sensor plane.

11. A system for sensing the position of a sensed object in space, the sensed object having a target located on an outer surface thereof, the target comprising at least three planar point reflectors on a substantially non-reflective background, the system comprising:

a target beam emitter for projecting a target beam to impinge upon the target to produce at least three reflected beams by reflection from the point reflectors, each reflected beam defining a point of intersection with a sensor plane; and reflected beam position detectors positioned to intercept each reflected beam for determining the points of intersection of the reflected beams with the sensor plane.

12. The system of claim 11, further comprising a digital computer coupled to the reflected beam detectors, the computer being programmed to calculate the displacement and rotation of the target object in space using the points of intersection between the reflected beams and the sensor plane.

13. The system of claim 11, wherein the reflected beam position detectors comprise lateral effect photodiodes.

14. A system for determining the position of a target object in space, comprising:

a target comprising a plurality of planar reflectors located on the target object;

means for projecting first and second beams of light to impinge upon the target, thereby creating a plurality of reflected beams by reflection of the first and second beams from the planar reflectors;

means for determining a points of intersection of the plurality of reflected beams with a sensor plane, said means being positioned in the sensor plane;

means for calculating the position of the target object in space using the points of intersection of the reflected beams with the sensor plane.

15. The system of claim 14, wherein the determining means comprises a position sensitive detector located in the sensor plane, the position sensitive detector having output terminals for providing output signals representing the location at which the reflected beam impinges upon the position sensitive detector.

16. The system of claim 15, wherein the calculating means comprises a digital computer coupled to the position sensitive detector.

17. A method for determining the position of a target object in space in six degrees of freedom without physically contacting the object, comprising the steps of:

providing a plurality of planar reflective surfaces;

emitting a plurality of projected light beams to impinge upon the reflective surfaces;

reflecting the projected light beams from the reflective surfaces to form reflected beams;

determining positions of the reflected beams; and calculating the position of the target object using the determined positions of the reflected beams.

18. The method of claim 17, further comprising providing lateral effect photodiodes located in a sensor plane, and employing said lateral effect photodiodes for determining positions of the reflected beams.

* * * * *

UNITED STATES PATENT AND TRADEMARK OFFICE
CERTIFICATE OF CORRECTION

PATENT NO.   :   5,552,883

DATED        :   September 3, 1996

INVENTOR(S)  :   Ilene Busch-Vishniac et al.

It is certified that error appears in the above-identified patent and that said Letters Patent is hereby corrected as shown below:

Title page,

On the title page: Item [21] delete "340,099" and insert --343,009--.

Signed and Sealed this

Twelfth Day of November, 1996

Attest:

BRUCE LEHMAN

Attesting Officer          Commissioner of Patents and Trademarks